United States Patent [19]

Thomas, III et al.

[11] Patent Number: 5,329,930
[45] Date of Patent: Jul. 19, 1994

[54] PHASED ARRAY SECTOR SCANNER WITH MULTIPLEXED ACOUSTIC TRANSDUCER ELEMENTS

[75] Inventors: Lewis J. Thomas, III, Schenectady, N.Y.; Michael J. Harsh, Waukesha, Wis.

[73] Assignee: General Electric Company, Schenectady, N.Y.

[21] Appl. No.: 135,521

[22] Filed: Oct. 12, 1993

[51] Int. Cl.5 ............................................. A61B 8/00
[52] U.S. Cl. ........................... 128/661.01; 128/660.07
[58] Field of Search ..................... 128/660.06, 660.07, 128/660.08, 661.01; 73/625, 626, 597; 364/413.25

[56] References Cited

U.S. PATENT DOCUMENTS

| | | | |
|---|---|---|---|
| 4,983,970 | 1/1991 | O'Donnell et al. | 341/122 |
| 5,014,712 | 5/1991 | O'Donnell | 128/661.01 |
| 5,230,340 | 7/1993 | Rhyne | 128/661.01 |
| 5,235,983 | 8/1993 | Iida et al. | 128/660.07 |
| 5,271,276 | 12/1993 | Katakura et al. | 128/661.01 |
| 5,278,757 | 1/1994 | Hoctor et al. | 128/661.01 |

OTHER PUBLICATIONS

M. O'Donnell, "Efficient Parallel Beam Forming for Phased Array Imaging Using Phase Rotation", Proc. of IEEE Ultrasonics Symposium, vol. 3, pp. 1495–1498, 1990.
C. M. W. Daft et al., "Beam Profiles and Images from Two-Dimensional Arrays", Proc. of IEEE Ultrasonics Symposium, vol. 2, pp. 775–779, 1990.
S. R. Doctor et al., "SAFT-the Evolution of a Signal Processing Technology for Ultrasonic Testing", NDT International, vol. 19, No. 3, pp. 163–167, Jun. 1986.
D. C. Munson, Jr. et al., "A Tomographic Formulation of Spotlight-Mode Synthetic Aperture Radar", Proc. IEEE, vol. 71, No. 8, Aug. 1983.
S. D. Silverstein et al., "Analytical Comparison of Sensor Signal Processing Enhancements for NDT Synthetic Aperture Ultrasonic Imaging", IEEE Trans. on Image Proc., vol. 2, No. 1, Jan. 1993, pp. 60–67.

*Primary Examiner*—Francis Jaworski
*Assistant Examiner*—George Manuel
*Attorney, Agent, or Firm*—Marvin Snyder

[57] ABSTRACT

A phased array sector scanning ultrasonic imaging system includes a transducer array with 2N separate transducer elements and a transmitter and receiver with N separate channels. The complete 2N element aperture is realized at each beam angle with two firings of the transmitter and the receipt of echo signals from two different sets of N transducer elements. The echo signals from the two firings are coherently summed to form a single receive beam. Two different patterns are provided for selecting which transducer elements to energize and receive from during each of the two firings.

13 Claims, 6 Drawing Sheets

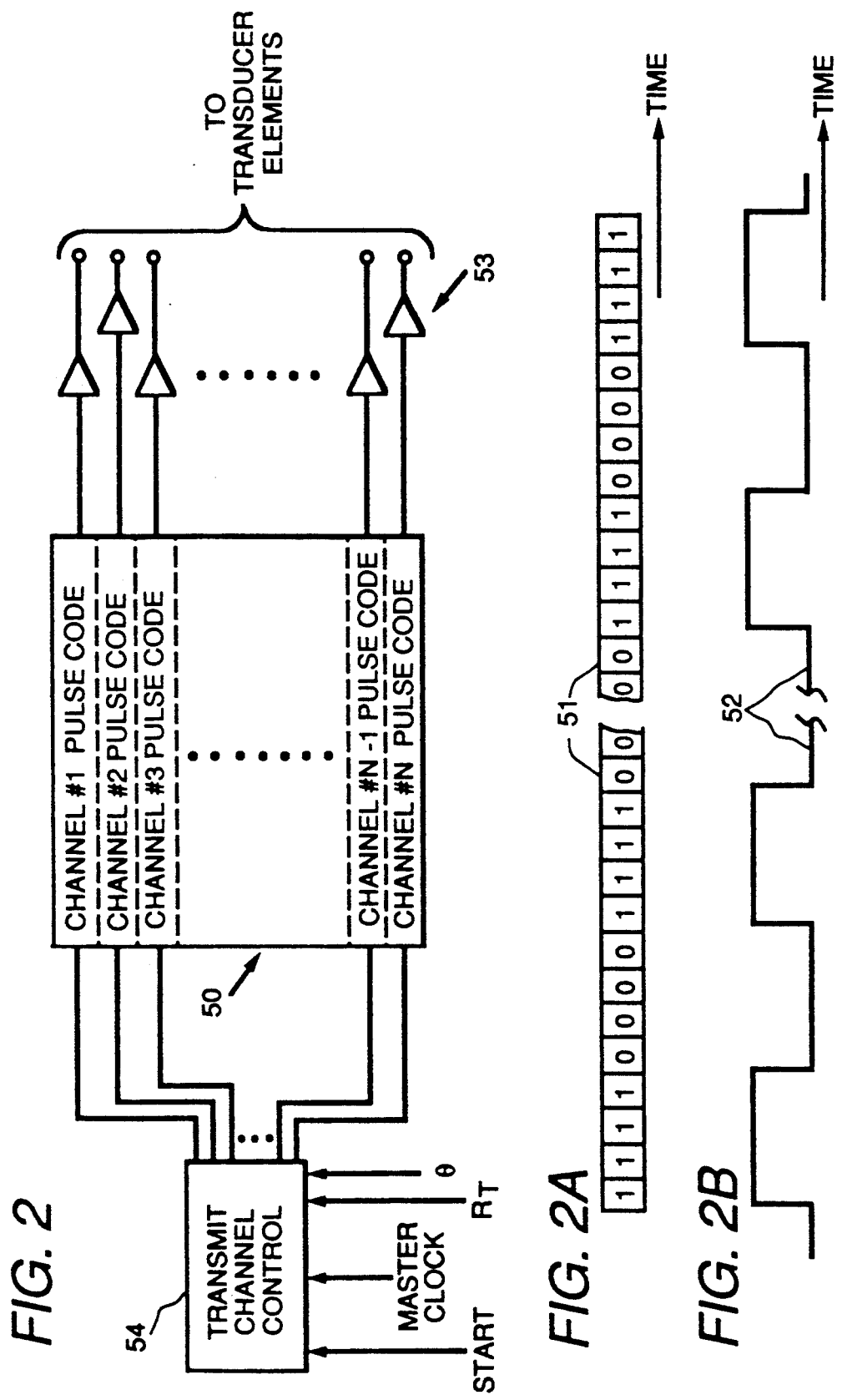

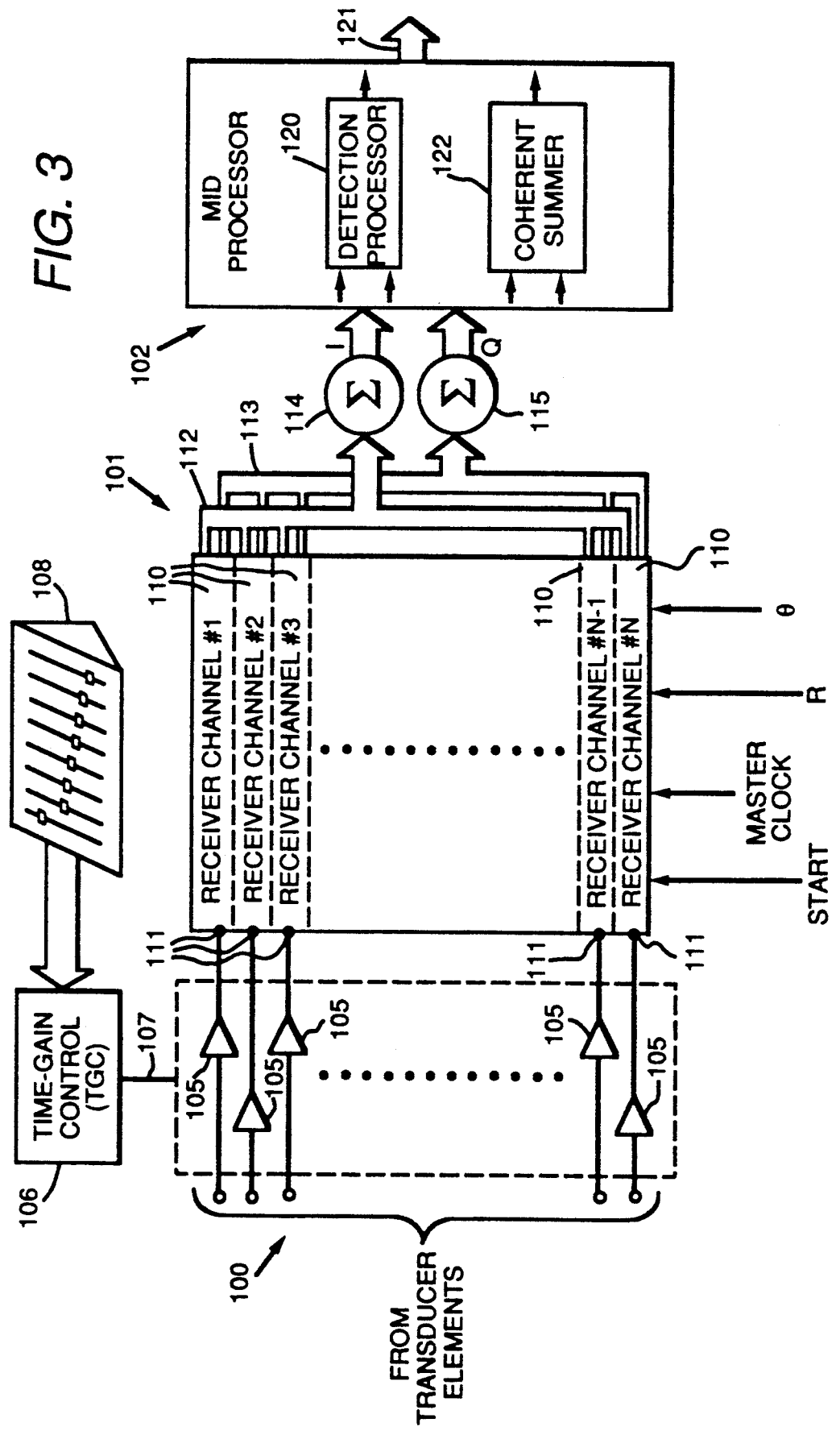

PHASED ARRAY SECTOR SCANNER WITH MULTIPLEXED ACOUSTIC TRANSDUCER ELEMENTS

BACKGROUND OF THE INVENTION

This invention relates to imaging by use of vibratory energy such as acoustical energy and, in particular, to phased array sector scanners employed in medical imaging.

There are a number of modes in which vibratory energy, such as ultrasound can be used to produce images of objects. The ultrasound transmitter may be placed on one side of the object and the sound transmitted through the object to the ultrasound receiver placed on the other side ("transmission mode"). With transmission mode methods, an image may be produced in which the brightness of each pixel is a function of amplitude of the ultrasound that reaches the receiver ("attenuation" mode), or the brightness of each pixel is a function of the time required for the sound to reach the receiver ("time-of-flight" or "speed of sound" mode). In the alternative, the receiver may be positioned on the same side of the object as the transmitter and an image may be produced in which brightness of each pixel is a function of amplitude of the ultrasound reflected from the object back to the receiver ("refraction", "backscatter" or "echo" mode). The present invention relates to a backscatter method for producing ultrasound images.

There are a number of well known backscatter methods for acquiring ultrasound data. In the so-called "A-scan" method, an ultrasound pulse is directed into the object by the transducer and the amplitude of the reflected sound is recorded over a period of time. The echo signal amplitude is proportional to the scattering strength of the reflectors in the object and the time delay is proportional to the range of the reflectors from the transducer. In the so-called "B-scan" method, the transducer transmits a series of ultrasonic pulses as it is scanned across the object along a single axis of motion. The resulting echo signals are recorded as with the A-scan method and their amplitude is used to modulate the brightness of pixels on a display at the time delay. With the B-scan method, enough data are acquired from which an image of the reflectors can be reconstructed.

In the so-called C-scan method, the transducer is scanned across a plane above the object and only the echoes reflecting from the focal depth of the transducer are recorded. The sweep of the electron beam of a CRT display is synchronized to the scanning of the transducer so that the x and y coordinates of the transducer correspond to the x and y coordinates of the image.

Ultrasonic transducers for medical applications are constructed from one or more piezoelectric elements sandwiched between a pair of electrodes. Such piezoelectric elements are typically constructed of lead zirconate titanate (PZT), polyvinylidene difluoride (PVDF), or PZT ceramic/polymer composite. The electrodes are connected to a voltage source, and when a voltage waveform is applied, the piezoelectric elements change in size at a frequency corresponding to that of the applied voltage. When a voltage waveform is applied, the piezoelectric element emits an ultrasonic wave into the media to which it is coupled at the frequencies contained in the excitation waveform. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is coupled to the rear of the piezoelectric element to absorb ultrasonic waves that emerge from the back side of the element so that they do not interfere. A number of such ultrasonic transducer constructions are disclosed in U.S. Pat. Nos. 4,217,684; 4,425,525; 4,441,503; 4,470,305 and 4,569,231, all of which are assigned to the instant assignee.

When used for ultrasound imaging, the transducer typically has a number of separate piezoelectric elements arranged in an array and driven with separate voltages (apodizing). By controlling the time delay (or phase) and amplitude of the applied voltages, the ultrasonic waves produced by the piezoelectric elements (transmission mode) combine to produce a net ultrasonic wave that travels along a preferred beam direction and is focused at a selected point along the beam. By controlling the time delay and amplitude of the applied voltages, the beam with its focal point can be moved in a plane to scan the subject.

The same principles apply when the transducer is employed to receive the reflected sound (receiver mode). That is, the voltages produced at the transducer elements in the array are summed together such that the net signal is indicative of the sound reflected from a single focal point in the subject. As with the transmission mode, this focused reception of the ultrasonic energy is achieved by imparting separate time delay (and/or phase shifts) and gains to the signal from each transducer array element. These functions require a separate channel for processing the signal from each transducer element.

This form of ultrasonic imaging is referred to as "phased array sector scanning", or "PASS". Such a scan is comprised of a series of measurements in which the steered ultrasonic wave is transmitted, the system switches to receive mode after a short time interval, and the reflected ultrasonic wave is received and stored. Typically, the transmission and reception are steered in the same direction ($\theta$) during each measurement to acquire data from a series of points along an acoustic beam or scan line. The receiver is dynamically focused at a succession of ranges (R) along the scan line as the reflected ultrasonic waves are received. The time required to conduct the entire scan is a function of the time required to make each measurement and the number of measurements required to cover the entire region of interest at the desired resolution and signal-to-noise ratio. For example, a total of 128 scan lines may be acquired over a 90 degree sector, with each scan line being steered in increments of 0.70°. A number of such ultrasonic imaging systems are disclosed in U.S. Pat. Nos. 4,155,258; 4,155,260; 4,154,113; 4,155,259; 4,180,790; 4,470,303; 4,662,223; 4,669,314 and 4,809,184, all of which are assigned to the instant assignee.

The quality of image produced using the PASS method is in part determined by the number of separate transducer elements employed in the array. By increasing the number of array elements, the aperture is increased, resulting in a finer speckle structure and improved resolution.

The number of array elements used in a PASS system is, however, usually limited by commercial considerations. Not only does the size of the transducer array increase as the number of separate elements increases, but more significantly, the additional transmit and receive channels required for beam forming increases the hardware requirements and system complexity. A state-of-the art commercially available PASS ultrasonic imaging system, for example, may have 128 separate transducer elements and a corresponding number of transmit and receive channels, but to double this number would drive the size and complexity of the system upward. The increased size and complexity of the system, moreover, would tend to make it not price competitive.

One approach which enables the number of array elements to be increased without a corresponding increase in the transmit and receive channels is to multiplex the transducer elements with the available transmit/receive channels. In this method wherein the transducer array elements are 2N in number, the central array elements, N in number, are driven by the corresponding N transmit channels during a first firing at each beam angle in the scan and the N receive channels are switched to receive the signals from the N odd numbered array elements in the 2N array. This is followed by a second firing at the same beam angle using the central N array elements. The N receive channels are switched to receive the signals from the N even numbered array elements and the received signals are summed with the signals from the first firing. While this approach effectively doubles the number of receive array elements with a consequent improvement in image quality, it is not without cost. In addition to doubling the scan time, a separate multiplexer is needed for each of the N receive channels and a separate transmit/receive switch is required for each of the 2N array elements.

SUMMARY OF THE INVENTION

The present invention relates to a PASS ultrasonic imaging system and, more particularly, to a method for increasing the number n of separate transducer array elements without a corresponding increase in the number of transmit and receive channels. More specifically, a first beam is produced using a first subset of N transducer array elements, and the echo signals are received from a second subset of N transducer array elements and stored. The process may be repeated with received signals from different second subsets of N array elements until echo signals have been received from all n transducer array elements, and the stored signals are coherently summed to produce the receive beam. In one preferred embodiment the central N array elements are the transmitting first subset of N elements used in the production of each beam, the same N elements are used to receive the first beam signals and other ones of the n array elements are the second subset of N elements used to receive subsequent beam signals. In another preferred embodiment, the n array elements are scanned in a plurality of firings in which the N array elements in the transmitting first subset of N elements are the same as the N array elements in the receiving second subset of N elements during each firing.

A general object of the invention is to increase the number of transducer array elements employed in a PASS system without a corresponding increase in the number of transmit or receive channels. A transmit/receive switch is required for each channel of the transmitter and a multiplexer is required for each channel of the receiver. Since transmit/receive switches are required in any system, the only added hardware required to implement the invention, therefore, is a set of multiplexers and the memory and adder required to coherently sum the beam signals.

Another object of the invention is to reduce the number of transmit/receive switches required in a PASS system of any given capacity. By judiciously selecting which transducer array elements are included in each subset, the number of transmit/receive switches may be limited to the number of transmit channels employed in the system.

Another object of the invention is to multiplex a large number of transducer elements in a PASS system with a smaller number of receive channels. By judiciously selecting which transducer array elements are included in each subset, sufficient time is made available to switch the multiplexer without inducing switching noise into the received data.

BRIEF DESCRIPTION OF THE DRAWINGS

FIG. 2 is a block diagram of a transmitter which forms part of the system of FIG. 1;

FIGS. 2A and 2B are graphical illustrations of the signal in any of the channels of transmitter 50 of FIG. 2;

FIG. 3 is a block diagram of a receiver which forms part of the system of FIG. 1;

DESCRIPTION OF THE PREFERRED EMBODIMENTS

Figure 1:
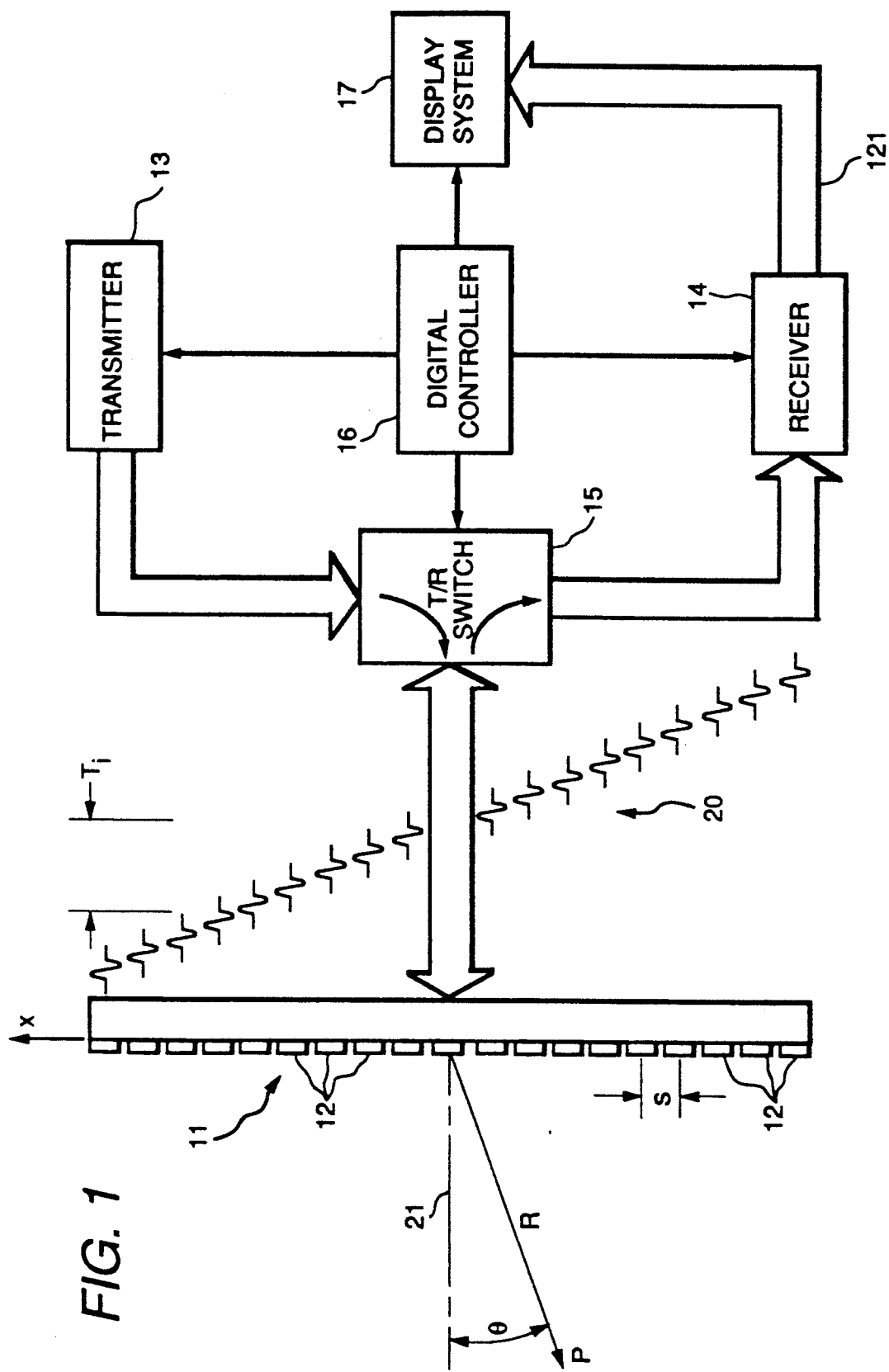
FIG. 1 is a block diagram of an ultrasonic imaging system which employs the present invention.

Referring particularly to FIG. 1, an ultrasonic imaging system includes a transducer array 11 comprised of a plurality of separately driven elements 12 which each produce a burst of ultrasonic energy when energized by a pulsed waveform produced by a transmitter 13. The ultrasonic energy reflected back to transducer array 11 from the subject under study is converted to an electrical signal by each transducer element 12 and applied separately to a receiver 14 through a set of transmit/receive (T/R) switches 15. Transmitter 13, receiver 14 and switches 15 are operated under control of a digital controller 16 responsive to commands by a human operator. A complete scan is performed by acquiring a series of echoes in which switches 15 are set to their transmit position, transmitter 13 is gated on momentarily to energize each transducer element 12, switches 15 are then set to their receive position, and the subsequent echo signals produced by transducer elements 12 are applied to receiver 14. The separate echo signals from transducer elements 12 are combined in receiver 14 to produce a single echo signal which is employed to produce a line in an image on a display system 17.

Transmitter 13 drives transducer array 11 such that the ultrasonic energy produced is directed, or steered, in a beam. A B-scan can therefore be performed by moving this beam through a set of angles from point-to-point rather than physically moving transducer array 11. To accomplish this, transmitter 13 imparts a time delay ($T_i$) to the respective pulses 20 that are applied to successive transducer elements 12. If the time delay is zero ($T_i = 0$), all the transducer elements 12 are energized simultaneously and the resulting ultrasonic beam is directed along an axis 21 normal to the transducer face and originating from the center of transducer array 11. As the time delay ($T_i$) is increased, as illustrated in FIG. 1, the ultrasonic beam is directed downward from central axis 21 by an angle $\theta$. The relationship between the time delay increment $T_i$ added successively to each $i^{th}$ signal from one end of the transducer array (i=1) to the other end (i=n) is given by the following relationship:

$$T_i = R_T/c - \sqrt{(R_T/c)^2 + (x/c)^2 - 2xR_T\sin\theta/c^2} \quad (1)$$

where:
- x = distance of center of element i from center of transducer array,
- $\theta$ = transmit beam angle,
- c = velocity of sound in the object under study, and
- $R_T$ = range at which transmit beam is focused.

The time delays $T_i$ in equation (1) have the effect of steering the beam in the desired angle $\theta$, and causing it to be focused at a fixed range $R_T$. A sector scan is performed by progressively changing the time delays $T_i$ in successive excitations. The angle $\theta$ is thus changed in increments to steer the transmitted beam in a succession of directions. When the direction of the beam is above central axis 21, the The echo signals produced by each burst of ultrasonic energy emanate from reflecting objects located at successive positions (R) along the ultrasonic beam. These are sensed separately by each segment 12 of transducer array 11 and a sample of the magnitude of the echo signal at a particular point in time represents the amount of reflection occurring at a specific range (R). Due to the differences in the propagation paths between a reflecting point P and each transducer element 12, however, these echo signals will not occur simultaneously and their amplitudes will not be equal. The function of receiver 14 is to amplify and demodulate these separate echo signals, impart the proper time delay and phase shift to each and sum them together to provide a single echo signal which accurately indicates the total ultrasonic energy reflected from point P located at range R along the ultrasonic beam oriented at the angle $\theta$.

To simultaneously sum the electrical signals produced by the echoes from each transducer element 12, time delays and phase shifts are introduced into each separate transducer element channel of receiver 14. The beam time delays for reception are the same delays ($T_i$) as the transmission delays described above. However, in order to dynamically focus the receive beam, the time delay and phase shift of each receiver channel is continuously changing during reception of the echo to provide dynamic focusing of the received beam at the range R from which the echo signal emanates. The exact equation for the time delay imposed on the signal received by each transducer element is as follows:

$$T_d = t/2 - \sqrt{(t/2)^2 + (x/c)^2 - (xt/c)\sin(\theta)} \quad (2)$$

where:

- t = elapsed time since sound transmitted from center of transducer array (i.e. START),
- c = velocity of sound in the object under study,
- $\theta$ = beam angle, and
- x = distance of center of element from center of transducer array.

The same calculation, suitably scaled, also provides the correct phase shift.

Under the direction of digital controller 16, receiver 14 provides delays during the scan such that the steering of receiver 14 tracks with the direction of the beam steered by transmitter 13 and it samples the echo signals at a succession of ranges and provides the proper delays and phase shifts to dynamically focus at points P along the beam. Thus, each emission, or firing, of an ultrasonic pulse waveform results in the acquisition of a series of data points which represent the amount of reflected sound from a corresponding series of points P located along the ultrasonic beam.

Display system 17 receives the series of data points produced by receiver 14 and converts the data to a form producing the desired image. For example, if an A-scan is desired, the magnitude of the series of data points is merely graphed as a function of time. If a B-scan is desired, each data point in the series is used to control the brightness of a pixel in the image, and a scan comprised of a series of measurements at successive steering angles ($\theta$) is performed to provide the data necessary for display.

As will be described in more detail below, transmitter 13 has 128 separate channels from each of which a pulse 20 is produced at the proper moment under the direction of digital controller 16. Similarly, receiver 14 has 128 separate receive channels, each of which receives an echo signal and processes it separately before the receiver combines the echo signals into a focused and directed receive beam. Accordingly, T/R switch 15 has 128 separate channels for alternately connecting the 128 transmit channels and then the 128 receive channels to 128 separate transducer elements 12 on the ultrasonic transducer 11. The present invention addresses the situation in which there are more transducer elements 12 than transmit and receive channels. In the two preferred embodiments now to be described, transducer 11 has 256 separate transducer elements 12 which must be multiplexed through the 128 available channels.

Figure 1A:
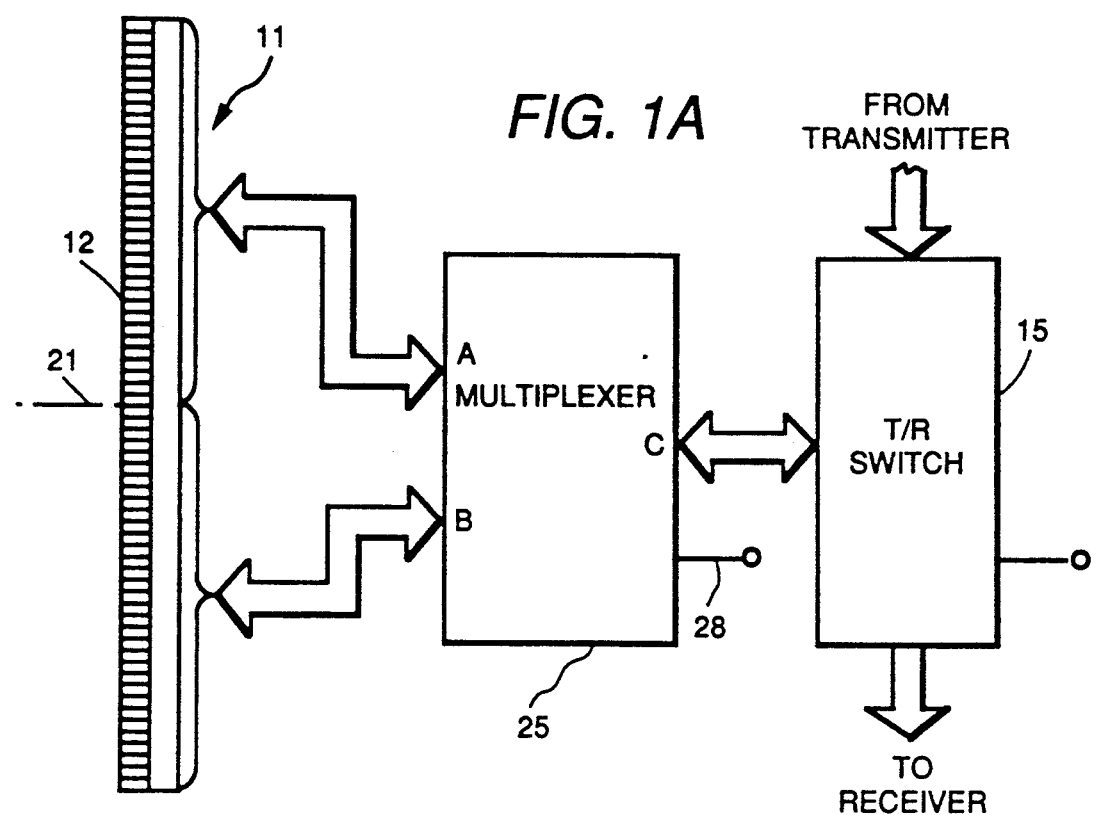
FIG. 1A is a block diagram of a first embodiment of the invention as applied to the ultrasonic imaging system of FIG. 1.

Referring particularly to FIG. 1A, in the first embodiment of the invention a 128 channel bidirectional multiplexer 25 is coupled between T/R switches 15 and transducer 11. More specifically, the 128 leads at the A port of multiplexer 25 are coupled to one half of the n transducer elements 12 (N=1-128), and the 128 leads at the B port are coupled to the other half (N=129-256) of transducer elements 12. The 128 leads at the multiplexer's common port C are coupled to the respective T/R switches 15. A control line 28 driven by digital controller 16 (FIG. 1) selects the A or B port of the multiplexer 25. Each multiplexer is equivalent in operation to a Model HV22816 manufactured by Supertex, Inc., Sunnyvale, Calif., and switches between the A and B ports within 6 microseconds.

In the first embodiment of the invention, each beam is acquired in two separate firings of transmitter 13 (FIG. 1). During the first firing, multiplexer 25 selects the A port and T/R switch 15 connects the 128 transmitter channels to the lower one half of transducer elements 12 (N=1-128). T/R switch 15 is then set to receive by digital controller 16 (FIG. 1) and the echo signals received at the same transducer elements 12 (N=1-128) are coupled to the 128 receiver channels. For the second firing, multiplexer 25 is switched to select the B port, and the process is repeated to energize the other half of transducer elements 12 (N=129-256) and to receive the echo signals therefrom. As will be described in more detail below, the received echo signals from all 256 transducer elements 12 are coherently summed in receiver 14 (FIG. 1) to form one receive beam.

Figure 1B:
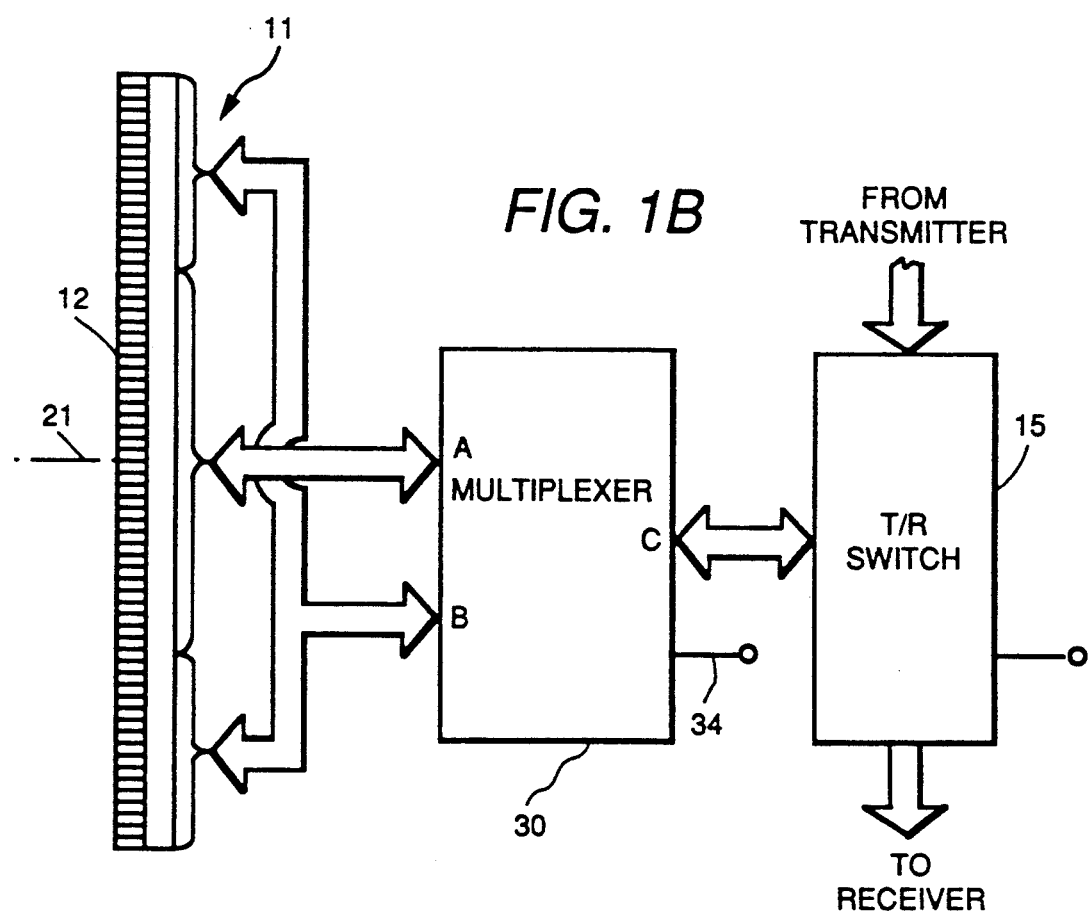
FIG. 1B is a block diagram of a second embodiment of the invention as applied to the ultrasonic imaging system of FIG. 1.

Referring particularly to FIG. 1B, in the second embodiment of the invention a 128 channel bidirectional multiplexer 30 couples T/R switches 15 to transducer 11. In this embodiment, however, the 128 leads at the A port of multiplexer 30 are coupled to the center 128 elements 12 (N=65-192) of transducer 11, and the leads at its B port are coupled to the remaining peripheral elements 12 (N=1-64 and 193-256). The multiplexer port (A or B) is selected through a control line 34 by digital controller 16 (FIG. 1), but its operation is substantially different than the first embodiment described above.

In the second embodiment, the data for one beam direction is again obtained in two successive firings of transmitter 13 (FIG. 1). In the first firing, the A port of multiplexer 30 is selected during both transmission and reception. Thus a beam is launched from the central 128 elements 12 (N=65-192) of transducer 11, T/R switch 15 changes to the receive mode, and the echo signal is received by the same central 128 elements 12 (N=65-192). The echo signals from the first firing are stored in receiver 14 (FIG. 1) and a second transmission is launched from the same central elements 12 (N=65-192). After the second firing, however, multiplexer 30 is switched to its B port at the same time that T/R switches 15 are changed to receive, and the resulting echo signals are received from the peripheral transducer elements 12 (N=1-64 and 193-256). The echo signals received from the two firings are coherently summed in receiver 14 to produce a single beam signal for display 17 (FIG. 1).

The second embodiment of the invention relies on the fact that during ultrasonic imaging with array transducers one rarely transmits using the full aperture of transducer 11. The reason is that although receiver 14 is able to dynamically focus during reception of the echo signal, the transmitted ultrasonic beam has a fixed focus during each firing. Therefore, to improve depth of field of the transmitted ultrasonic beam the transmitting aperture may intentionally be set smaller than the receive aperture. In the second embodiment, the transmit aperture remains the same at 128 elements, but the receive aperture is effectively doubled to 256 elements, thus enabling the dynamically focused receive beam to be narrowed with a resulting increase in image resolution.

The second embodiment also relies on another characteristic of imaging with array transducers. In general, switching multiplexer 30 between array elements 12 after transmission and before reception is very difficult. Large transients are generated by this switching process and spurious signals are induced in the transducer channels for a short time period. However, beam forming receiver 14 (FIG. 1) does not start capturing echo signals from all array elements at the same time. In fact, acquisition starts first at the central elements and progresses outward from central axis 21 in accordance with the following equation:

$$T_{on} = 8\cos(\theta)|x|/c$$

where:

x is the distance of transducer element 12 from central axis 21;

$\theta$ is the beam angle; and c is the velocity of sound.

Therefore, a time interval for a typical transducer in the range of tens of microseconds exists before the second echo signal is acquired for the peripheral transducer elements (N=1-64 and 193-256). Consequently, if the devices identified above for use in multiplexer 25 (FIG. 1A) are employed, the noise induced by the switching of multiplexer 30 from its A port to its B port has an ample opportunity to settle before data is acquired.

Referring to FIG. 2 in conjunction with FIG. 1, transmitter 13 includes a set of channel pulse code memories which are indicated collectively at 50. In the preferred embodiment there are 128 separate channel pulse code memories 50. Each pulse code memory 50 is typically a 1-bit by 512-bit memory which stores a bit pattern 51 that determines the frequency of ultrasonic pulse 52 that is to be produced. In the preferred embodiment this bit pattern is read out of each pulse code memory 50 by a 40 MHz master clock and applied to a driver 53 which amplifies the signal to a power level suitable for driving transducer 11. In the example shown in FIG. 2A, the bit pattern is a sequence of four "1" bits alternated with four "0" bits to produce a 5 MHz ultrasonic pulse 52; however, other carrier frequencies ($F_0$) are employed in the preferred embodiment, such as 2.5, 3.75, 6.25, 7.5, 8.75 and 10 MHz. Transducer elements 12 to which these ultrasonic pulses 52 are applied respond by producing ultrasonic energy. If all 512 bits are used, a pulse of bandwidth as narrow as 40 kHz centered on the carrier frequency (i.e. 5 MHz in the example) will be emitted.

As indicated above, to steer the transmitted beam of the ultrasonic energy in the desired direction ($\theta$), pulses 52 for each of the channels must be delayed by the proper amount. These delays are provided by a transmit control 54 which receives four control signals (START, MASTER CLOCK, $R_T$ and $\theta$) from the digital controller 16 (FIG. 1). Using the input control signal $\theta$, the fixed transmit focus $R_T$, and the above equation (1), transmit control 54 calculates the delay increment $T_i$ required between successive transmit channels. When the START control signal is received, transmit control 54 gates one of four possible phases of the 40 MHz MASTER CLOCK signal through to the first transmit channel 50. At each successive delay time interval ($T_i$) thereafter, the 40 MHz MASTER CLOCK signal is gated through to the next channel pulse code memory 50 until all 128 channels are producing their ultrasonic pulses 52. Each transmit channel 50 is reset after its entire bit pattern 51 has been transmitted and transmitter 13 then waits for the next $\theta$ and next START control signals from digital controller 16. As indicated above, in the preferred embodiment of the invention a complete B-scan is comprised of 128 ultrasonic beams steered in $\Delta\theta$ increments of 0.70° through a 90° sector centered about the central axis 21 (FIG. 1) of transducer array 11.

It should be apparent that when practicing the second embodiment of the present invention, transmitter 13 is operated identically in both firings at each beam angle $\theta$. However, when practicing the first embodiment of the invention, time delays $T_i$ are different for the two firings at each beam angle $\theta$ since the energized transducer elements 12 differ for each firing. In addition to controlling T/R switches 15 and multiplexer 25, therefore, digital controller 16 must also change the time delays produced by transmitter 13 between firings in accordance with the above equation (1).

For a detailed description of the transmitter 13, reference is made to commonly assigned U.S. Pat. No. 5,014,712 issued on May 14, 1991 and entitled "Coded Excitation For Transmission Dynamic Focusing of Vibratory Energy Beam", incorporated herein by reference.

Referring particularly to FIG. 3 in conjunction with FIG. 1, receiver 14 is comprised of three sections: a time-gain control section 100, a beam forming section 101, and a mid processor 102. Time-gain control section 100 includes an amplifier 105 for each of the 128 receiver channels and a time-gain control circuit 106. The input of each amplifier 105 is coupled to a respective one of transducer elements 12 to receive and amplify the echo signal which it receives. The amount of amplification provided by amplifiers 105 is controlled through a control line 107 that is driven by time-gain control circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the sector scan. The time interval over which the echo signal is acquired determines the range from which it emanates, and this time interval is divided into eight segments by TGC control circuit 106. The settings of the eight potentiometers are employed to set the gain of amplifiers 105 during each of the eight respective time intervals so that the echo signal is amplified in ever increasing amounts over the acquisition time interval.

The beam forming section 101 of the receiver 14 includes 128 separate receiver channels 110. Each receiver channel 110 receives the analog echo signal from one of TGC amplifiers 105 at an input 111, and it produces a stream of digitized output values on an I bus 112 and a Q bus 113. Each of these I and Q values represents a sample of the echo signal envelope at a specific range (R). These samples have been delayed and phase shifted such that when they are summed at summing points 114 and 115 with the I and Q samples from each of the other receiver channels 110, they indicate the magnitude and phase of the echo signal reflected from a point P located at range R on the steered beam ($\theta$). In the preferred embodiment, each echo signal is sampled at 150 micrometer increments over the entire range of the scan line (typically 40 to 200 millimeters).

For a general description of a receiver channel 110 and a detailed description of how the I and Q output signals of each receiver channel 110 are summed together to form a beam signal, reference is made to commonly assigned U.S. Pat. No. 4,983,970 which issued on Jan. 8, 1991 and is entitled "Method and Apparatus For Digital Phased Array Imaging" which is incorporated herein by reference. For a detailed description of a receive channel 110, reference is made to commonly assigned U.S. patent application Ser. No. 07/867,597 filed on Apr. 13, 1992, entitled "Ultrasound Imaging System With Improved Dynamic Focusing" which is incorporated herein by reference.

Since receiver channels 110 are coupled to different transducer elements 12 on each of the two firings at each beam angle $\theta$, the time delays $T_d$ must be changed for each firing. The time delay $T_d$ for each receiver channel is determined by the above equation (2) and digital controller 16 configures receiver 14 with the proper time delays before each firing of transmitter 13. Thus, for each beam angle $\theta$, receiver 14 is configured with one set of time delay values $T_d$ for the first firing and is reconfigured with a second set of $T_d$ values for the second firing.

Referring still to FIG. 3, mid processor section 102 receives the beam samples from the summing points 114 and 115. The I and Q values of each beam sample are 20-bit digital numbers which represent the in-phase and quadrature components of the magnitude of the reflected sound from a point (R, $\theta$). Mid processor 102 can perform a variety of calculations on these beam samples, where choice is determined by the type of image to be reconstructed. For example, if a conventional magnitude image is to be produced, a detection process indicated at 120 is implemented in which a digital magnitude M is calculated from each beam sample and produced at output 121 according to $$M = \sqrt{I^2 + Q^2}.$$

However, before this magnitude M can be calculated, the beam samples from the two firings at each beam angle $\theta$ must be coherently summed to produce a beam which encompasses the entire receive aperture of the 256 element transducer array 11. This is also accomplished in the mid-processor by a coherent summer 122 which is shown in more detail in FIG. 5.

Figure 5A:
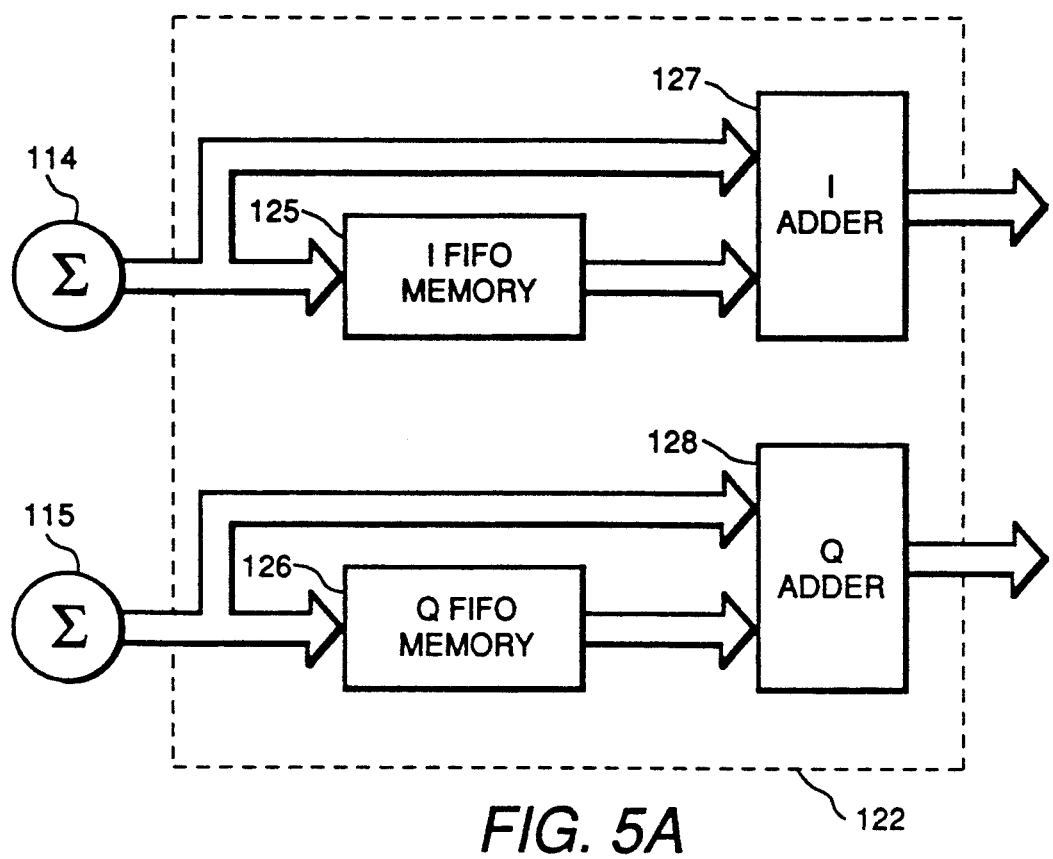
FIGS. 5A and 5B are block diagrams of two embodiments of the coherent summer 122 which forms part of the receiver of FIG. 3.

Referring to FIG. 5A, coherent summer 122 is shown to include two 16-bit wide FIFO (first in, first out) memories 125 and 126 which have their inputs connected to respective summing points 114 and 115. During the first firing at each beam angle $\theta$, FIFO memories 125 and 126 receive and store the successive I and Q beam samples produced by beam forming section 101 (FIG. 3). During the second firing at each beam angle $\theta$, FIFO memories 125 and 126 apply these successively stored I and Q beam samples to I and Q adder circuits 127 and 128. The successive beam samples from the first firing are thus applied to adders 127 and 128 as the corresponding I and Q beam samples from the second firing are produced at the respective summing points 114 and 115. As a result, corresponding I and Q samples in the two firings at the same beam angle $\theta$ are successively added together to form a single coherently summed beam. As described above, these I and Q samples of the coherently summed beam are applied to detection processor 120 (FIG. 3) to produce a stream of digital magnitude values M that are supplied to display system 17 (FIG. 1).

Figure 5B:
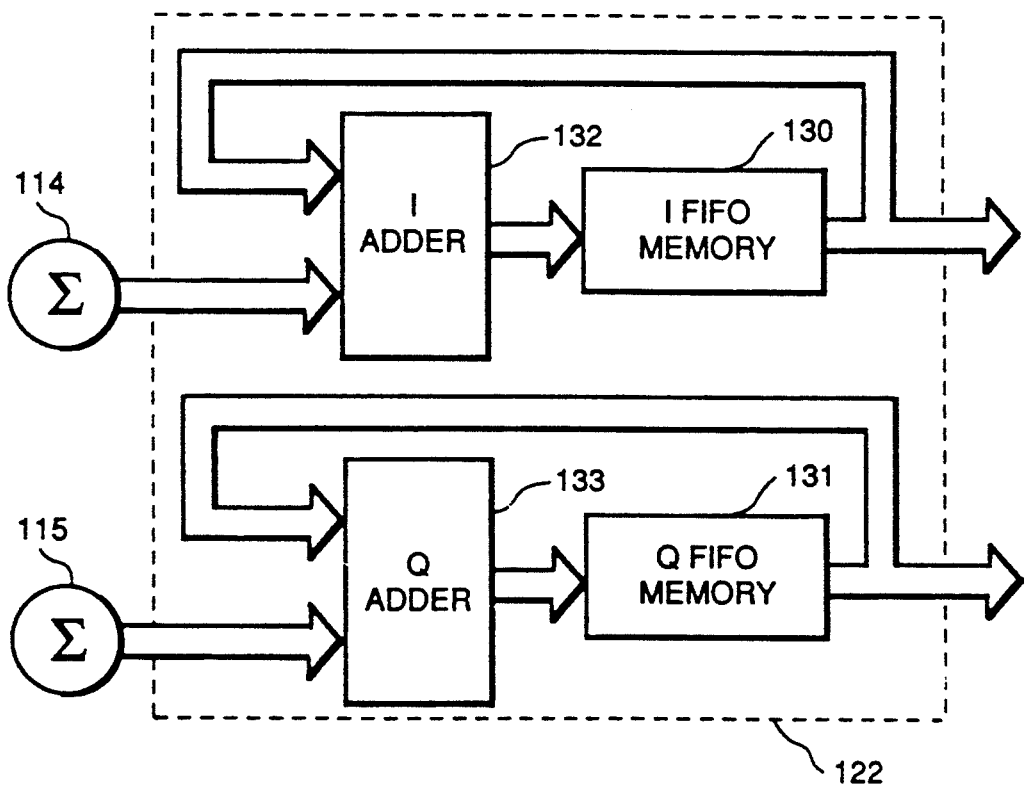

It should be apparent that coherent summer 122 shown in FIG. 5A and described above must be modified if more than two firings are required to form a single coherent beam. An alternative embodiment is shown in FIG. 5B for applications requiring the coherent summing of more than two firings. In this embodiment the contents of two FIFO memories 130 and 131 are initialized to zero at the beginning of each set of firings at a particular beam angle $\theta$, and the contents of these I and Q FIFO memories 130 and 131 are coherently summed at respective adders 132 and 133 with the incoming beam samples from each firing in the set. The output signals of adders 132 and 133 are reloaded into the I and Q FIFO memories 130 and 131 and, after each firing, memories 130 and 131 store the sum of all previous firings. After all firings are complete, the contents of I and Q FIFO memories 130 and 131 are produced as the coherently summed I and Q receive beams.

Figure 4:
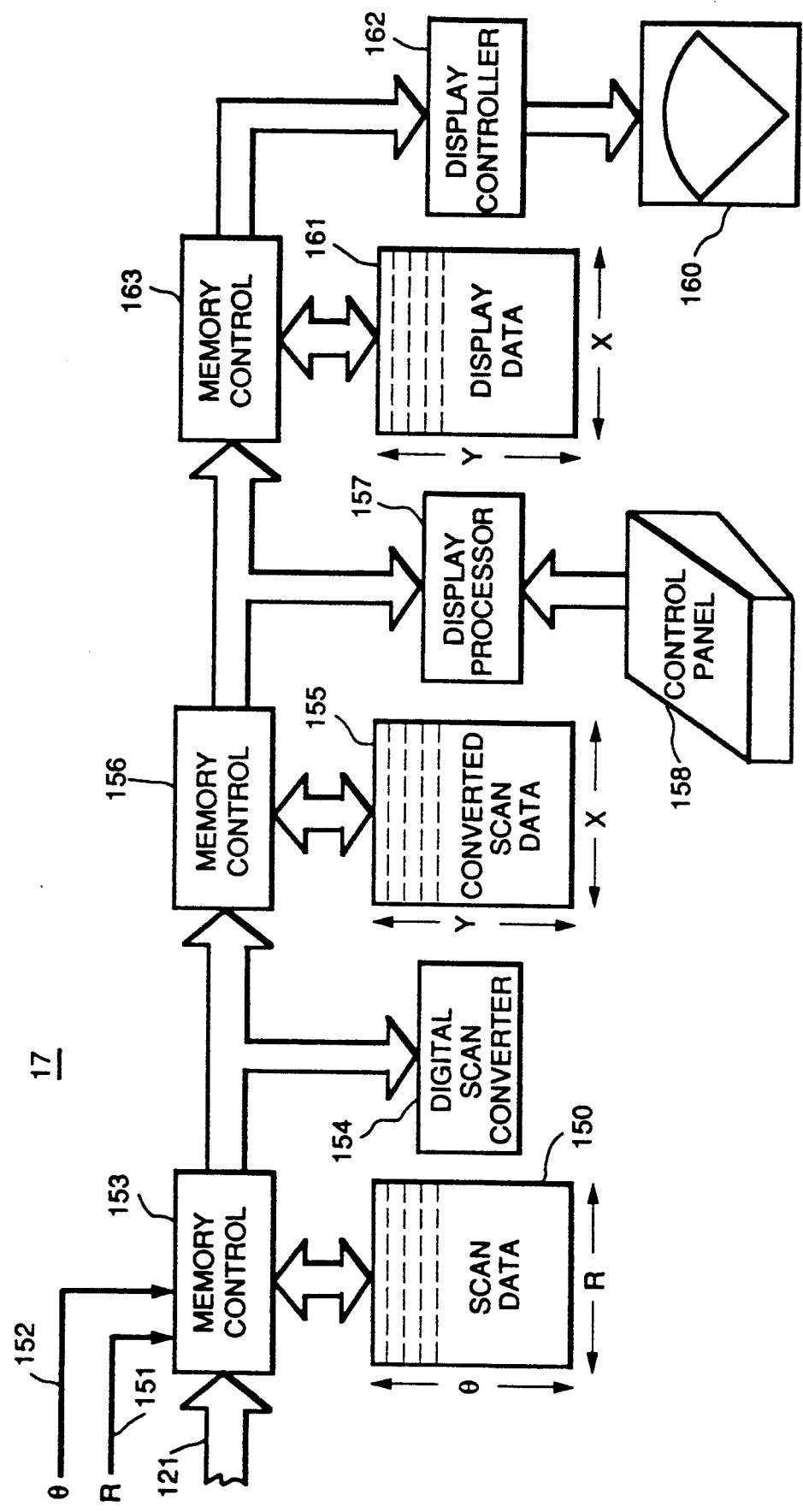
FIG. 4 is a block diagram of a display system which forms part of the system of FIG. 1.

Referring particularly to FIGS. 1 and 4, receiver 14 generates a stream of 8-bit digital numbers at its output 121 which is applied to the input of display system 17. This "scan data" is stored in a memory 150 as an array, with the rows of the scan data array 150 corresponding with the respective beam angles ($\theta$) that are acquired, and the columns of the scan data array 150 corresponding with the respective ranges (R) at which samples are acquired along each beam. The R and $\theta$ control signals 151 and 152 from receiver 14 indicate where each input value is to be stored in array 150, and a memory control circuit 153 writes that value to the proper memory location in array 150. The scan can be continuously repeated and the flow of values from receiver 14 will continuously update the scan data array 150.

Referring still to FIG. 4, the scan data in array 150 are read by a digital scan converter 154 and converted to a form producing the desired image. If a conventional B-scan image is being produced, for example, the magnitude values $M(R,\theta)$ stored in the scan data array 150 are converted to magnitude values $M(x,y)$ which indicate magnitudes at pixel locations (x,y) in the image. Such a polar coordinate to Cartesian coordinate conversion of the ultrasonic image data is described, for example, in an article by Steven C. Leavitt et al. in *Hewlett-Packard Journal*, October, 1983, pp. 30-33, entitled "A Scan Conversion Algorithm for Displaying Ultrasound Images."

Regardless of the particular conversion made by digital scan converter 154, the resulting image data are written to a memory 155 which stores a two-dimensional array of converted scan data. A memory control 156 provides dual port access to memory 155 such that digital scan converter 154 can continuously update the values therein with fresh data while a display processor 157 reads the updated data. Display processor 157 is responsive to operator commands received from a control panel 158 to perform conventional image processing functions on the converted scan data in memory 155. For example, the range of brightness levels indicated by the converted scan data 155 may far exceed the brightness range of display device 160. Indeed, the brightness resolution of the converted scan data in memory 155 may far exceed the brightness resolution of the human eye, and manually operable controls are typically provided which enable the operator to select a window of brightness values over which maximum image contrast is to be achieved. The display processor reads the converted scan data from memory 155, provides the desired image enhancement, and writes the enhanced brightness values to a display memory 161.

Display memory 161 is shared with a display controller circuit 162 through a memory control circuit 163, and the brightness values therein are mapped to control the brightness of the corresponding pixels in display 160. Display controller 162 is a commercially available integrated circuit which is designed to operate the particular type of display 160 used. For example, display 160 may be a CRT, in which case display controller 162 is a CRT controller chip which provides the required sync pulses for the horizontal and vertical sweep circuits and maps the display data to the CRT at the appropriate time during the sweep.

It should be apparent to those skilled in the art that display system 17 may take one of many forms depending on the capability and flexibility of the particular ultrasound system. In the preferred embodiment described above, programmed microprocessors are employed to implement the digital scan converter and display processor functions, and the resulting display system is, therefore, very flexible and powerful.

It should also be apparent to those skilled in the art that the present invention may be applied to various types of transducer arrays. Transducer array 11 described in conjunction with FIG. 1 has 256 separate elements 12 all disposed in a single row which extends in opposite directions from central axis 21. These same 256 separate elements 12 may alternatively be disposed in a plurality of rows which extend in opposite directions from central axis 21. Also, these rows need not be of equal length. In one embodiment, for example, a central row containing 128 separate elements is disposed between two shorter rows of 64 elements each. All three rows are centered on the central axis 21 such that they extend in opposite directions therefrom.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

We claim:

1. A vibratory energy imaging system comprising:
   a transducer array having a plurality n of separate transducer elements disposed at successive locations in a plane that extends in opposite directions from a central axis;
   a multi-channel transmitter for energizing a set of transducer elements in the transducer array;
   a multi-channel receiver for receiving a number N of echo signals produced by N transducer elements in the transducer array, said receiver having N channels;
   switching means for selectively coupling at least a pair of transducer array elements, respectively, to individual channels of the transmitter, respectively, and to individual channels of the receiver, respectively; and
   a multi-channel multiplexer having a common port and a plurality of other ports, said common port being selectively coupled to any one of said plurality of other multiplexer ports in said multiplexer and being coupled to said switching means, said other multiplexer ports being coupled, respectively, to separate groups of N transducer elements, respectively,
   said multiplexer being operable during a plurality of firings of the transmitter to produce vibratory energy signals from successive sets of N transducer elements and to receive echo signals from said successive sets of N transducer elements for application to the N channels of the receiver, the receiver being operable to coherently sum the successive sets of N echo signals to form a single echo beam.

2. The vibratory energy imaging system as recited in claim 1 wherein the transmitter has N channels and the switching means comprises N separate switches, each of said switches being selectively coupled, respectively, to a separate channel, respectively, of said transmitter and a separate channel, respectively, of said receiver.

3. The vibratory energy imaging system as recited in claim 2 wherein the number of transducer array elements n is greater than the number of receiver channels N.

4. The vibratory energy imaging system as recited in claim 2 wherein the number of transducer array elements n is equal to twice the number of receiver channels N.

5. The vibratory energy imaging system as recited in claim 3 in which the transducer array elements energized by the transmitter during any firing are the same transducer array elements that apply the N echo signals to the receiver channels after said firing of the transmitter.

6. The vibratory energy imaging system as recited in claim 4 in which the transducer array elements energized by the transmitter during any firing are the same transducer array elements that apply the N echo signals to the receiver channels after said firing of the transmitter.

7. The vibratory energy imaging system as recited in claim 1 wherein each set of transducer elements energized by the transmitter on each of its firings is substantially centered about the central axis.

8. The vibratory energy imaging system as recited in claim 7 wherein one of the successive sets of N transducer elements coupled through the multi-channel multiplexer to the N channels of the receiver following one of the firings of the transmitter includes all of the transducer elements energized by the transmitter on said one of the firings.

9. The vibratory energy imaging system as recited in claim 8 wherein the transmitter has N channels and the switching means comprises N separate switches, each of said switches being selectively coupled, respectively, to a separate channel, respectively, of said transmitter and a separate channel, respectively, of said receiver.

10. The vibratory energy imaging system as recited in claim 9 wherein the number of separate transducer elements n is greater than N.

11. The vibratory energy imaging system as recited in claim 9 wherein the number of separate transducer elements n is equal to 2N.

12. The vibratory energy imaging system as recited in claim 1 wherein the receiver includes beam forming means for combining the N separate echo signals into a set of digital beam samples, and summing means for adding corresponding digital beam samples in two sets of digital beam samples produced during two successive firings of the transmitter.

13. The vibratory energy imaging system as recited in claim 12 wherein two firings of the transmitter are required for each echo beam, the receiver includes a memory for storing the set of digital beam samples formed from the first of said two successive firings of the transmitter, and the summing means is coupled to the memory means for adding the digital beam samples formed from the second of said two successive firings of the transmitter to the corresponding digital beam samples stored in the memory.

* * * * *